US012362376B2

(12) United States Patent
Gomez

(10) Patent No.: US 12,362,376 B2
(45) Date of Patent: Jul. 15, 2025

(54) PROCESS AND APPARATUS FOR SUSTAINABLE WATER FUELLED VEHICLE

(71) Applicant: Rodolfo Antonio M Gomez, Netley (AU)

(72) Inventor: Rodolfo Antonio M Gomez, Netley (AU)

( * ) Notice: Subject to any disclaimer, the term of this patent is extended or adjusted under 35 U.S.C. 154(b) by 0 days.

(21) Appl. No.: 18/774,217

(22) Filed: Jul. 16, 2024

(65) Prior Publication Data

US 2025/0125390 A1 Apr. 17, 2025

Related U.S. Application Data

(63) Continuation of application No. PCT/AU2023/051163, filed on Nov. 16, 2023.

(30) Foreign Application Priority Data

Oct. 17, 2023 (AU) ................ 2023903307

(51) Int. Cl.
| | |
|---|---|
| H01M 8/0656 | (2016.01) |
| C25B 1/04 | (2021.01) |
| C25B 9/19 | (2021.01) |
| C25B 9/65 | (2021.01) |
| C25B 9/70 | (2021.01) |
| H01M 8/04082 | (2016.01) |
| B60L 50/70 | (2019.01) |
| B64D 27/355 | (2024.01) |
| H01M 8/10 | (2016.01) |

(52) U.S. Cl.
CPC ............ *H01M 8/0656* (2013.01); *C25B 1/04* (2013.01); *C25B 9/19* (2021.01); *C25B 9/65* (2021.01); *C25B 9/70* (2021.01); *H01M 8/04201* (2013.01); *B60L 50/70* (2019.02); *B64D 27/355* (2024.01); *H01M 2008/1095* (2013.01); *H01M 2250/20* (2013.01)

(58) Field of Classification Search
CPC ........... H01M 8/0656; H01M 8/04201; H01M 2008/1095; H01M 2250/20; C25B 9/70; C25B 9/19; C25B 9/65; C25B 1/04; B60L 50/70; B64D 27/355
See application file for complete search history.

(56) References Cited

U.S. PATENT DOCUMENTS

| | | |
|---|---|---|
| 6,475,653 B1 | 11/2002 | Gomez |
| 7,326,329 B2 | 2/2008 | Gomez |
| 8,287,702 B2 | 10/2012 | Gomez |
| 10,316,416 B2 | 6/2019 | Gomez |

(Continued)

FOREIGN PATENT DOCUMENTS

| | | |
|---|---|---|
| AU | 2004237840 A1 | 6/2005 |
| AU | 2015291762 B2 | 1/2016 |

(Continued)

*Primary Examiner* — Lingwen R Zeng
(74) *Attorney, Agent, or Firm* — The Webb Law Firm

(57) ABSTRACT

A sustainable water fueled process and apparatus where a Unipolar electrolysis of water is described and the hydrogen and oxygen are stored before feeding a hydrogen fuel cell which is capable of providing sufficient electricity to provide power to a drive a vehicle, power a generator etc, after supplying electricity to the Unipolar electrolyser and the storage of the hydrogen and oxygen.

10 Claims, 12 Drawing Sheets

(56) References Cited

U.S. PATENT DOCUMENTS

| | | | |
|---|---|---|---|
| 2013/0093378 A1* | 4/2013 | Chen | H01M 8/0656 320/101 |
| 2016/0281243 A1* | 9/2016 | Gomez | C25B 11/031 |
| 2022/0119963 A1 | 4/2022 | Jung et al. | |

FOREIGN PATENT DOCUMENTS

| | | |
|---|---|---|
| CN | 105492658 A | 4/2016 |
| EP | 3940115 A1 | 1/2022 |
| GB | 2537456 A | 10/2016 |
| JP | 6178408 A | 6/1994 |
| JP | 200759196 A | 3/2007 |
| WO | 2015101914 A1 | 7/2015 |
| WO | 2016007983 A1 | 1/2016 |
| WO | 2022119407 A1 | 6/2022 |

\* cited by examiner

PROCESS AND APPARATUS FOR SUSTAINABLE WATER FUELLED VEHICLE

CROSS-REFERENCE TO RELATED APPLICATIONS

This application is a Bypass Continuation of International Patent Application No. PCT/AU2023/051163 filed Nov. 16, 2023, and claims priority to Australian Patent Application No. 2023903307 filed Oct. 17, 2023, the disclosures of which are hereby incorporated by reference in their entireties.

BACKGROUND

Technical Field

This application concerns the combination of unipolar electrolysis and hydrogen fuel cells to provide a system for the production of electricity. In particular, the present application discloses an improved energy system that replaces the need for carbon fuels in electric power generation and as fuel for land, water, and air vessels.

Description of Related Art

The recovery of hydrogen and oxygen gas from the electrolysis of water is well known. Conventional electrolysis of water provides yields only modest amounts of useful energy.

U.S. Pat. No. 10,316,416 describes Unipolar electrolysis of water that can produce green hydrogen scientifically as low as 5.37 kilowatt-hours per kilogram. In addition, "Non-diffusion Fuel Cell and a Process of Using a Fuel Cell" U.S. Pat. No. 6,475,653; Advanced Membrane Fuel Cell and a Non-diffusion Phosphoric Acid Fuel Cell describes fuel cells that are designed to deliver higher capacity or efficiency in converting green hydrogen to electric power or mechanical power.

FIG. 1 shows a prior art conventional water electrolysis system 100 for powering an electric motor vehicle, with a conventional electrolyser 115 having an anode side 120 and cathode side 125, separated by a proton exchange membrane (PEM) 127. Distilled water from the distilled water storage unit 130 is provided to the anode side 120 and cathode side 125 via distilled water conduits 135 and 140 respectively a DC power source 145 is operatively connected to the anode side 120 and cathode side 125.

On the anode side 120, the distilled water is reduced to oxygen, positively charged atoms (protons) and electrons. Oxygen produced on the anode side 120 is removed with any unconsumed water and fed to the oxygen storage tank 150. Alkaline or acid electrolyte on the anode side 120 is circulated via the circuit 155.

On the cathode side 125, protons that have travelled though the PEM combine with electrons from the DC power source 145 to form hydrogen gas, which is then fed to the hydrogen gas storage tank 160. Alkaline or acid electrolyte on the cathode side 125 is circulated via the circuit 165.

The oxygen gas storage tanks 150 and hydrogen gas storage tank 160 are connected to the hydrogen fuel cell 170, with cathode side 175 and anode side 180 to generate electrical energy. Energy produced by the hydrogen fuel cell 170 is directed to the electric motors 190 to drive the drive wheels 195 via the controls 200 as well as back to the DC power supply 145.

Water vapour produced by the hydrogen fuel cell 170 condensed by the condenser 210 and fed back to the distilled water storage unit 130.

For example, a conventional commercial electrolyser requires 49 kwh/kg of energy to operate. Hydrogen has an approximate heat value of between 120-143 MJ/kg. The heat value of a fuel is the amount of heat released during its combustion, this is also known as energy or calorific value. The heat value is a measure of a fuel's energy density and is expressed in energy (joules) per specified amount (e.g. kilograms).

Converting MJ to kwh, the factor is 0.277778 and with the lower heat value of hydrogen being 120 MJ/kg, then at an assumed efficiency of conversion of 85%, and then the power output of a hydrogen fuel cell, coupled with a conventional commercial electrolyser, from one kilogram of hydrogen is 33.33 (120×0.277778)×85%=28.3 kwh. This represents a shortfall of 20.7 kwh/kg for the 49 kwh/kg required by the DC supply 145.

With such a limited power output, conventional commercial electrolysers make them unsuitable, and unsustainable, to produce higher levels of energy that are necessary for efficient and effective power generation for high power demand situations, such as those required by land, water, and air vessels.

The prior art process will not proceed because the energy required by the conventional electrolyser is greater than the output of the hydrogen fuel cell.

SUMMARY

In one form of the invention there is an apparatus for producing electrical energy, the apparatus comprising a unipolar water electrolysis unit fluidly connected to a hydrogen fuel cell.

In a further form of the invention, there is an apparatus for producing electrical energy, the apparatus comprising a unipolar water electrolysis unit to produce hydrogen gas and oxygen gas, the produced hydrogen gas being stored in a hydrogen gas storage tank, the produced oxygen gas being stored in an oxygen storage tank, each of the hydrogen gas storage tank and oxygen gas storage tank being fluidly connected to a hydrogen fuel cell to produce electrical energy.

In preference, the unipolar water electrolysis unit having an anode side with an anode cell and a cathode side with a cathode cell.

In preference, the apparatus includes a water storage unit fluidly connected to the anode cell.

In preference, the apparatus includes a water storage unit fluidly connected to the cathode cell.

In preference, the anode cell includes:

an alkaline electrolyte producing oxygen and the cathode cell includes an acidic electrolyte producing hydrogen with a partition member separating the anode cell from the cathode cell;

a DC power supply connected to the anode and cathode cells; and at least a second electrolytic cell having at least one cathode compartment housing a cathode electrode receiving the positively charged alkaline electrolyte from the first anode cell and producing hydrogen, and having at least one anode compartment housing an anode electrode and receiving the negatively charged acidic electrolyte from the first cathode cell and producing oxygen with a partition member separating the anode cell from the cathode cell, when the anode electrodes and the cathode electrodes are connected in short circuit;

wherein at least there is one partition member separating the anode and cathode compartments in each of the first and second electrolytic cells In preference, the apparatus includes a diaphragm-less anode cell to produce oxygen wherein the anode cell has an anode and an anode solution electrode, the anode being connected to a DC power source, a diaphragm-less cathode cell to produce hydrogen wherein the cathode cell has a cathode and a cathode solution electrode, the cathode being connected to the DC power source, the anode solution electrode connected to the cathode solution electrode by an external conductor, means to supply a first electrolyte to the anode cell, means to supply a second electrolyte to the anode cell and means to apply a DC current from the DC power source to the anode and the cathode, wherein the first electrolyte and the second electrolyte are the same electrolyte and the means to supply the first electrolyte to the anode cell supplies the second electrolyte and the means to supply the second electrolyte to the anode cell supplies the first electrolyte and further including means to separate hydrogen from the second electrolyte between the cathode cell and the anode cell and means to separate oxygen from the first electrolyte between the anode cell and the cathode cell.

DETAILED DESCRIPTION

Figure 1:
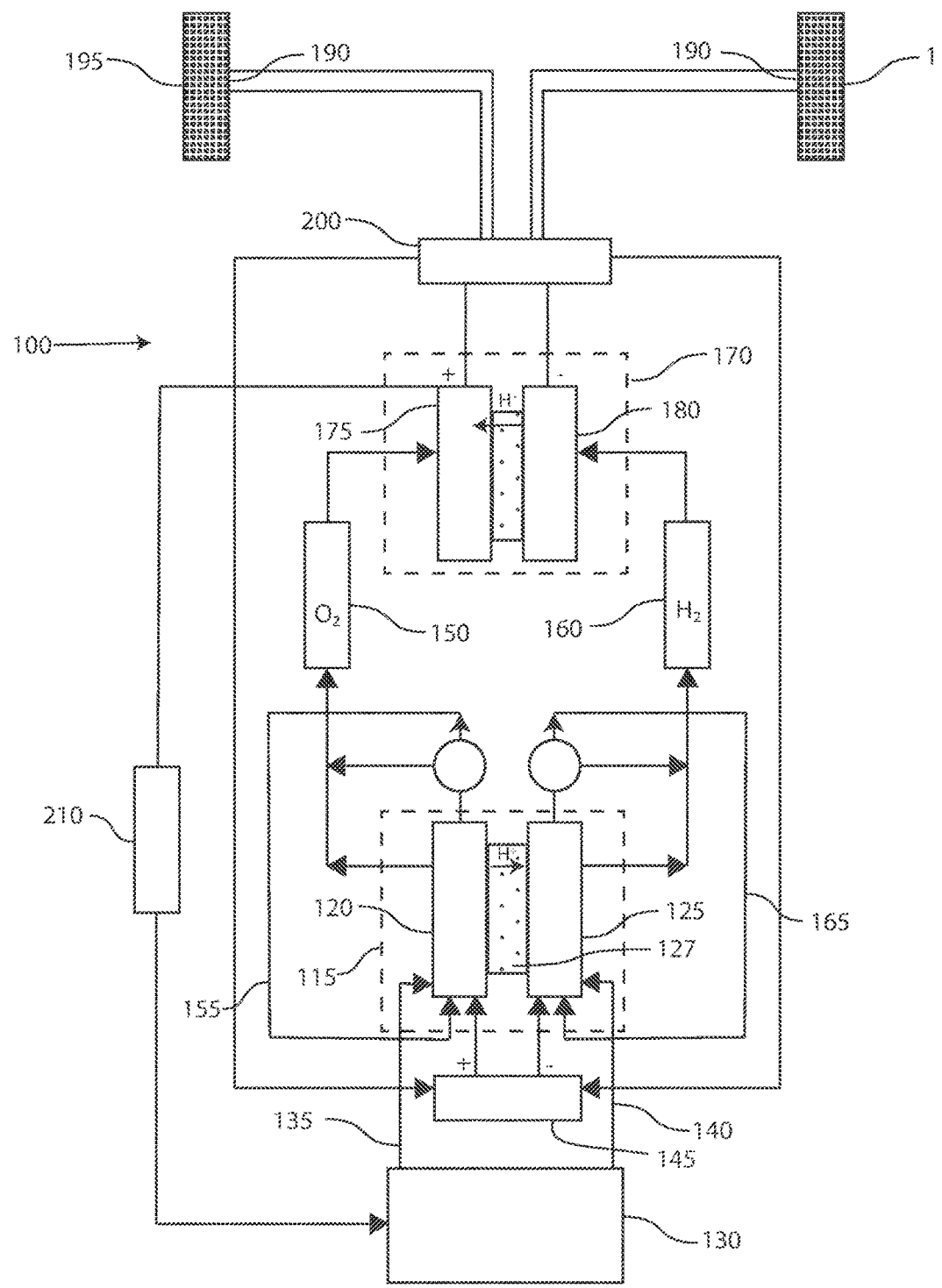
FIG. 1 is a diagrammatic view of a conventional commercial electrolyser coupled to a hydrogen fuel cell (prior art)

As shown in FIG. 1 (prior art), the conversion efficiency of a conventional electrolyser falls short of what is required to provide electrical energy to high energy demand environments, such as those required by electrical engines used by land, water, and air vessels.

Figure 2:
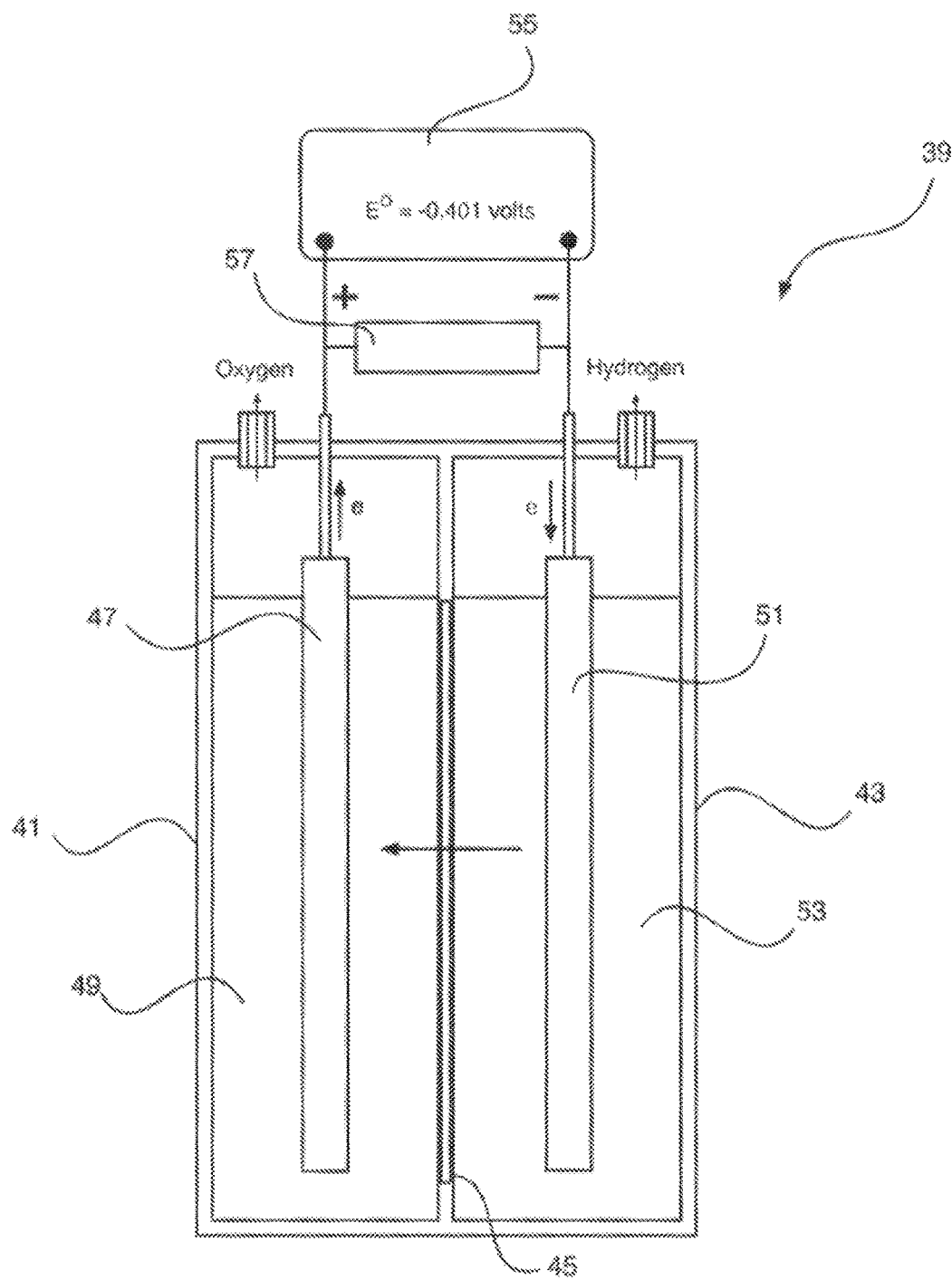
FIG. 2 is a diagrammatic of an embodiment of the electrolytic cell system of the present invention utilizing a conventional diaphragm to separate the anode and cathode compartment.
Figure 3A:
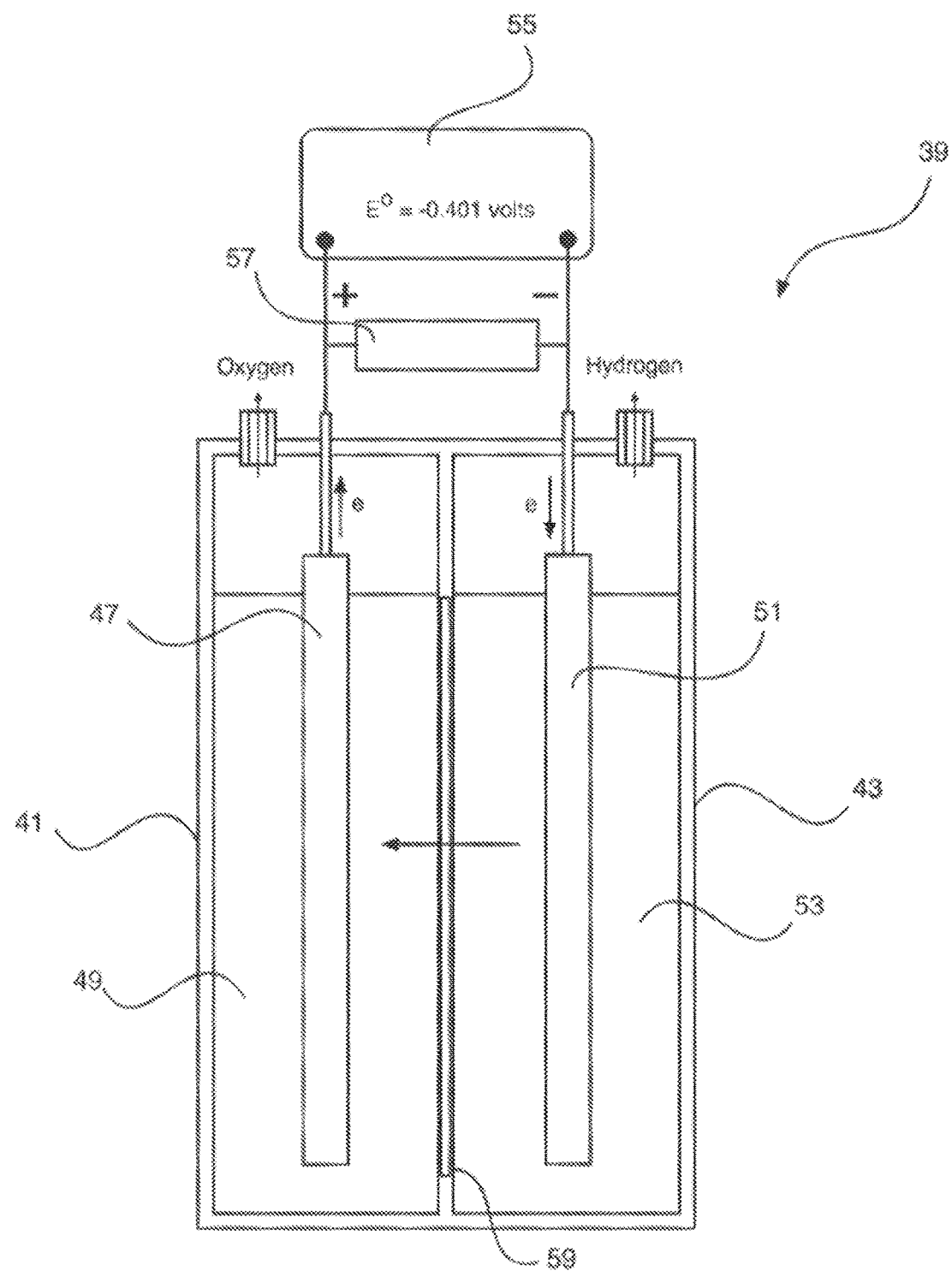
FIG. 3A illustrates a further embodiment of the electrolytic cell system used in a form of the present invention utilizing an electrolytic membrane to separate the anode and cathode compartment instead of the diaphragm.
Figure 3B:
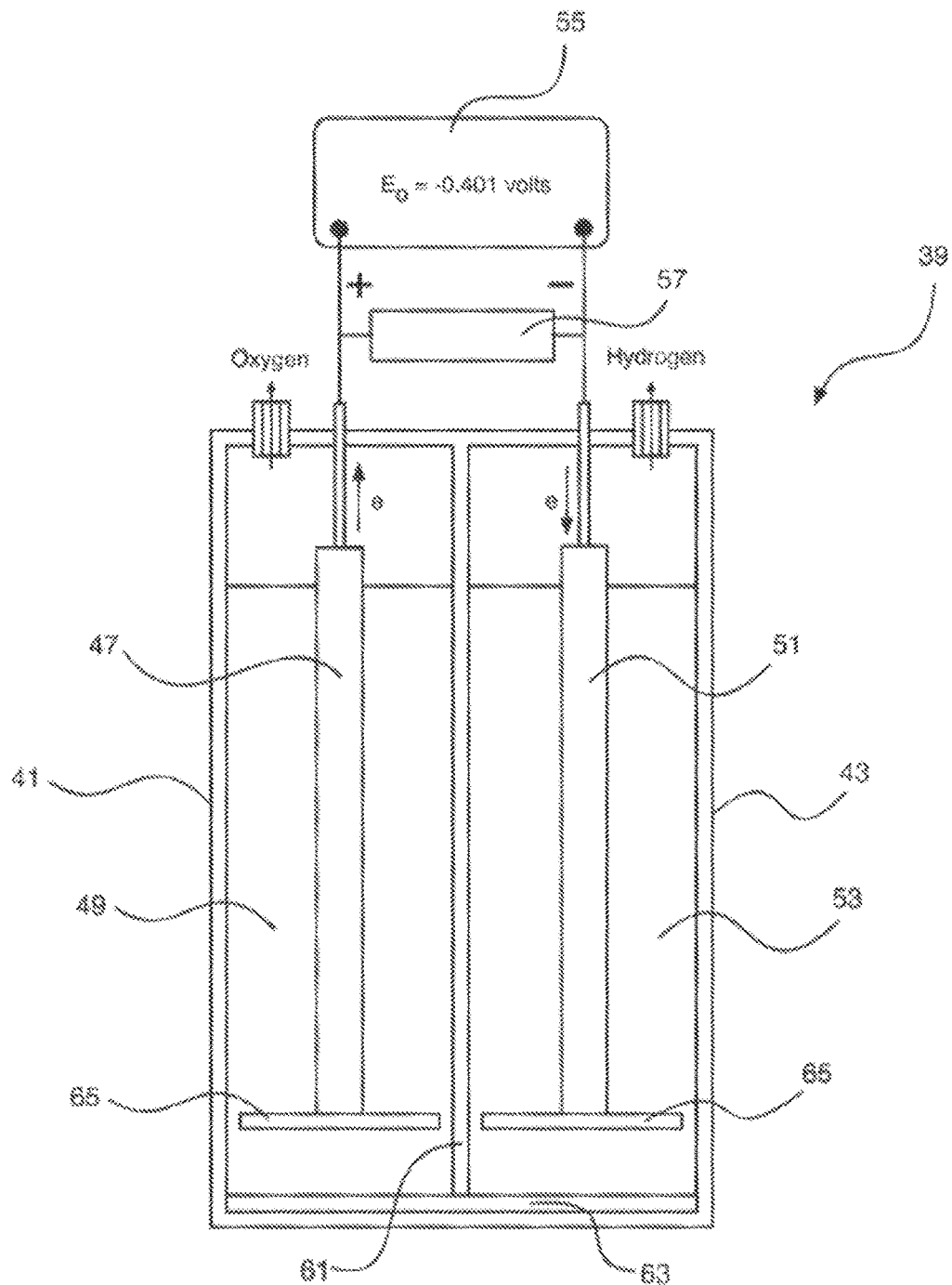
FIG. 3B illustrates a further embodiment of the electrolytic cell system used in a form of the present invention, utilizing the same structure as the diaphragm cell of FIG. 2 but wherein the anode and cathode compartment is separated by a non-conducting partition but connected by a salt bridge.

FIGS. 2, and 3A, 3B illustrate differing embodiments of the electrolytic cell 39 of the present invention.

FIG. 2 illustrates an embodiment of the electrolytic cell 39 utilizing a conventional diaphragm cell formed of an anode compartment 41 and a cathode compartment 43, separated by a diaphragm 45. The anode compartment 41 houses an anode electrode 47 and an alkaline electrolyte solution 49 flows through the anode compartment 41. The cathode compartment 43 houses a cathode electrode 51 and an acidic electrolyte solution 53 flows through the cathode compartment 43. The anode 47 and cathode 51 electrodes are connected to a power source 55. The power source 55 being a DC power supply.

The modulator is a feature of the inventor's U.S. Pat. No. 7,326,329 and also in the inventor's U.S. Pat. No. 8,287,702 of the "Electrolytic Activation of Water" to produce strong biocides. In this invention, a modulator 57 is connected to the DC power source 55 and serves to generate and deliver the current from the DC power source 55 to the anode 47 or cathode 51 electrodes in the form of at least one current pulse. The modulator 57 is adapted to generate and deliver the current in a series of current pulses to the anode 47 or cathode 51 electrodes.

Like many other electrolytic cells, the modulator 57 is a feature of the present invention but is not claimed as the subject of this invention. In applying a current pulse or series of current pulses to either the anode 47 or cathode 51 electrodes, this advantageously minimizes the onset of polarization in the electrolytic cell 39 and therefore minimizes the adverse effects on the efficiency of the electrolytic cell 39.

The current pulse is applied to either the anode 47 or cathode 51 electrodes at a range of 100 to 80,000 Hertz and the standard electrode potential is $E_o = -0.401$ volts.

FIG. 3A illustrates a further embodiment of the electrolytic cell 39, however in place of the diaphragm 45 as in FIG. 2, an electrolytic membrane 59 separates the anode compartment 41 and a cathode compartment 43.

FIG. 3B illustrates further embodiment of the electrolytic cell 39. A non-conductor wall 61 separates the anode compartment 41 and a cathode compartment 43.

Obviously for any electrolytic cell to function properly, there must be a complete electrical circuit. In the embodiment illustrated in FIG. 3B, the circuit is completed through use of a conducting member 63 comprising of either a salt bridge, a semi-conductor plate or a conductor plate. It is readily appreciated that the conducting member 63 may comprise of any suitable member or means known within the art that will enable and maintain electrical connection between the anode electrode 47 and the cathode electrode 51.

Further, the anode 47 and cathode 51 electrodes are connected to a base member In the illustrated embodiment, the base member 65 is flat plate attached to the bottom of the anode 47 and cathode 51 electrodes. This base member 65 comprises of the same material or coating as the respective anode 47 and cathode 51 electrodes to which it is attached.

The current flow through the electrolytic cell 39 of FIG. 3B is such that the current flows from the DC power source 55, to the modulator 57, to the cathode electrode 51, to the base member 65 attached to the cathode electrode 51, through conducting member 63 comprising of either a salt bridge, semi-conductor or conductor plate, to the base member 65 attached to the anode electrode 47, to the anode electrode 47, back to the DC power source 55.

The electrolytic cell 39 illustrated in FIG. 3B is the preferred embodiment of the present invention as it offers several advantages including:

The least resistance or impedance;

The materials exposed to the alkaline and acidic electrolytes can be selected to withstand high and low pH of the respective electrolytes; and It offers the highest possible capacity for commercial operation and production of hydrogen.

It would be readily appreciated that any number of anode 47 and cathode 51 electrodes can be attached to the base member 63 in the electrolytic cell 39 illustrated in FIG. 3B, to increase the capacity of the electrolytic cell 39 and system.

Figure 4A:
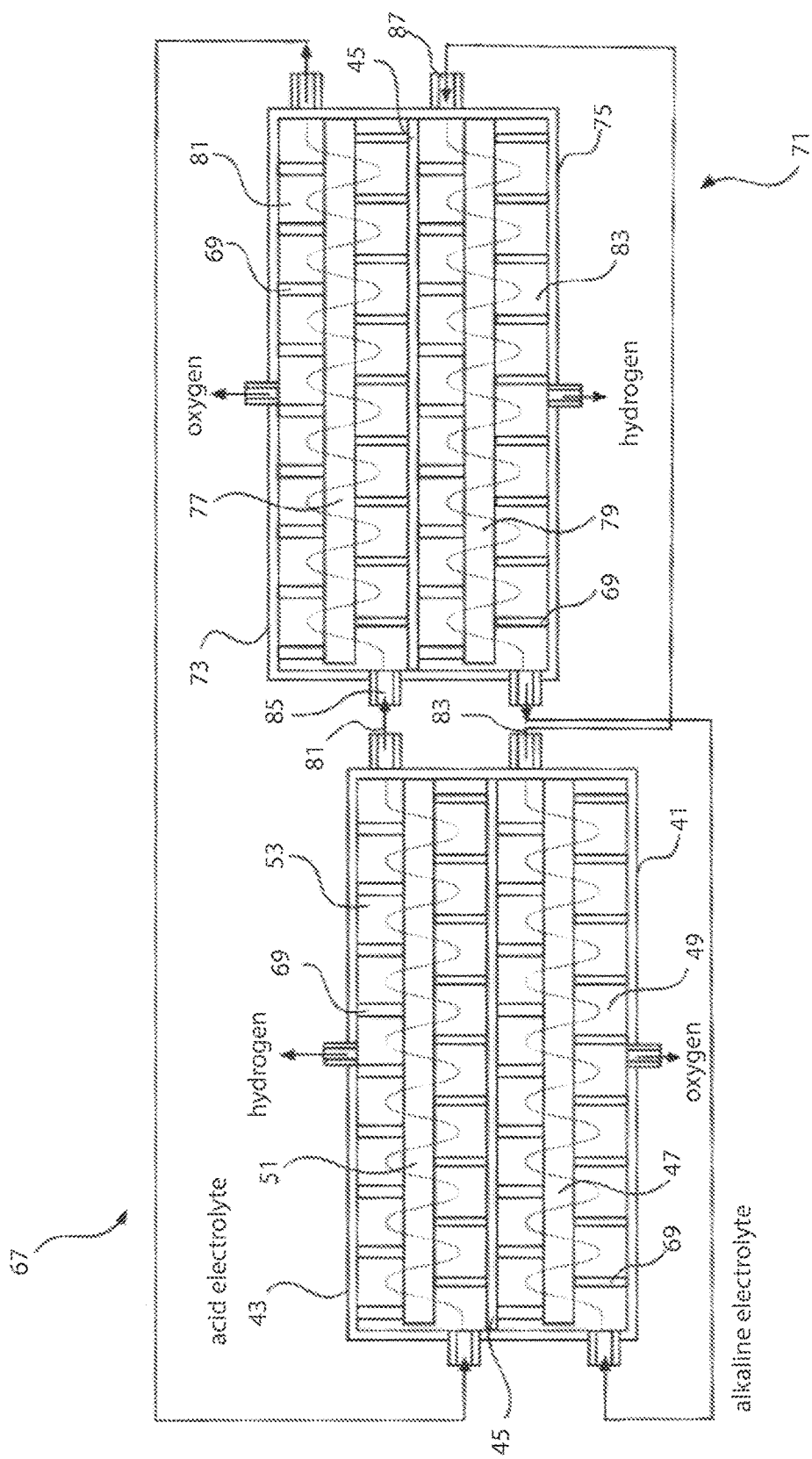
FIG. 4A is a plan view of the electrolytic system of the present invention having an charging section and a neutralization section.

FIG. 4A is a plan view of an electrolytic cell of the present invention, utilizing two electrolytic cells, a first electrolytic cell 67 and a second electrolytic cell 71, each having an anode compartment 41, 73 and a cathode compartment 43, 75 separated by a diaphragm 45. A first electrolytic cell 67 serves as the electrolytic section where electric power is applied. The first electrolytic cell 67 comprises of an anode electrode 47 and a cathode electrode 51. The anode 47 and cathode 51 electrodes are formed of a porous material such as expanded mesh or similar construction.

Each of the anode compartments 41, 73 and a cathode compartments 43, 75 further comprise and house a plurality of non-conductive members 69. The non-conductive members 69 being a plurality of plastic baffles.

The non-conductive members 69 assist to facilitate the movement and flow of the alkaline 49, 83 and acidic 53, 81 electrolyte solutions throughout the anode compartments 41, 73 and a cathode compartments 43, 75. The non-conductive members 69 force the alkaline 49, 83 and acidic 53, 81 electrolyte solutions in and out of the porous mesh structures of anode electrodes 47, 77 and a cathode electrodes 51, 79.

The anode electrodes 47, 77 and cathode electrodes 51, 79 for example, can be formed from titanium mesh. Further, the anode electrodes 47, 77 and a cathode electrodes 51, 79 may be coated with a suitable catalyst to favour the reaction that is desired at the respective anode electrodes 47, 77 and a cathode electrodes 51, 79.

For example, the anode electrodes 47, 77 that produce oxygen, can be coated with a catalyst made from oxides of ruthenium and iridium or platinum or mixtures. Similarly, the cathode electrodes 51, 79 may be coated with a catalyst having different ratios of the platinum group oxides.

A second electrolytic cell 71 serves as a neutralization section, comprising of an anode compartment 73 and a cathode compartment 75 and houses an anode electrode 77 and a cathode electrode 79, respectively. The second electrolytic cell 71 allows the neutralization of the negatively charged acidic electrolyte solution 81 and the positively charged alkaline electrolyte solution 83, exiting from the first electrolytic cell 67.

The anode and cathode electrodes of the second electrolytic cell form a short circuit to allow current flow from the acidic electrolyte to the alkaline electrolyte. The short circuit results in minimal resistance or impedance. As a result, current flows between the anode electrode 77 and the cathode electrode 79 and according to Faraday's Law, chemical reactions occur at the anode electrode 77 and the cathode electrode 79.

Figure 4B:
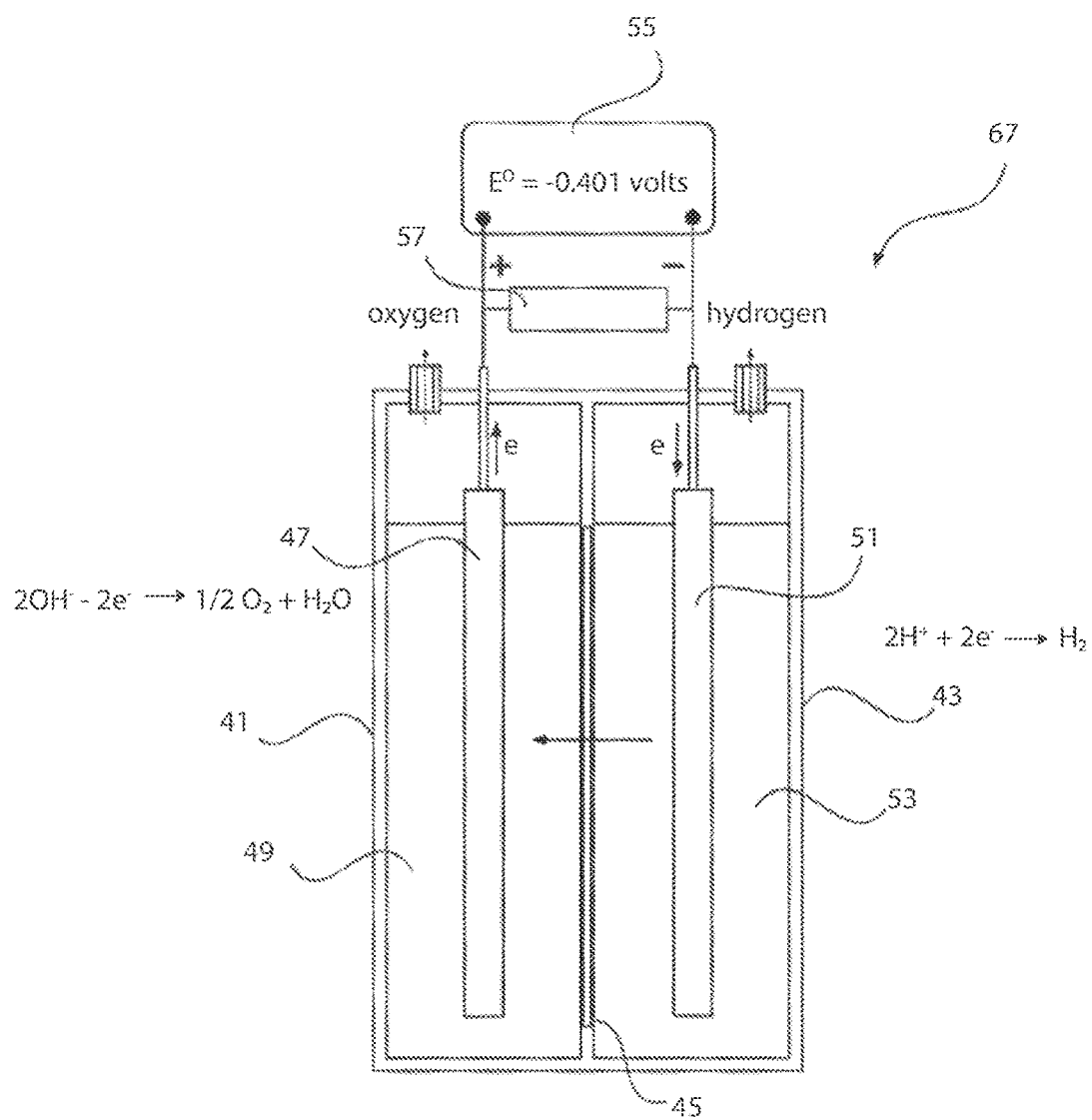
FIG. 4B is a cross sectional view of the charging electrolytic section of FIG. 4A.

The current flows in the first electrolytic cell 67 of FIG. 4A are shown in FIG. 4B, which is a cross section of the first electrolytic cell 67. The current flows from the DC source 55 to the anode electrode 47, through the diaphragm 45 and then to the cathode electrode 51 to the DC power source 55.

Figure 4C:
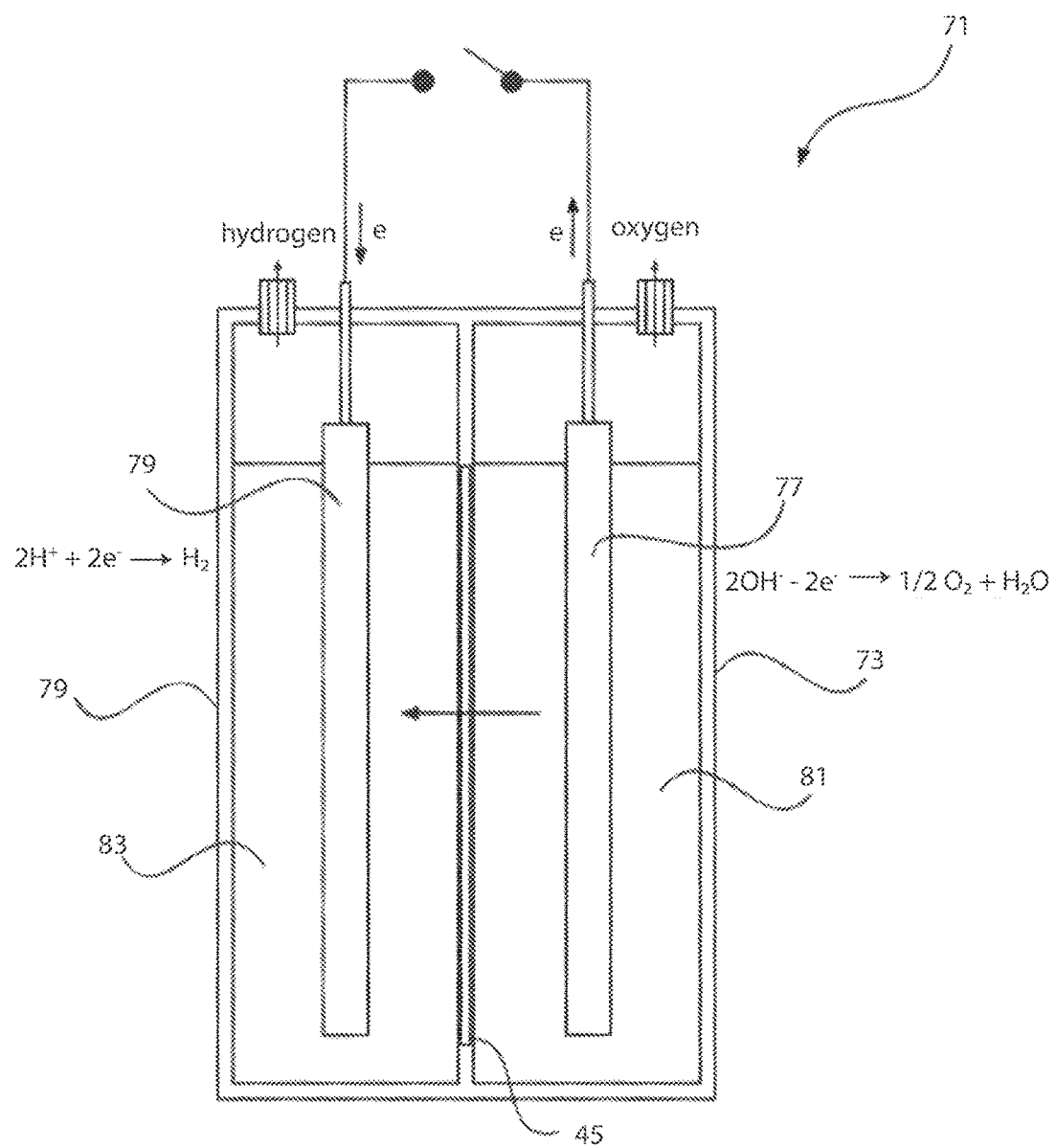
FIG. 4C is a cross sectional view of the neutralization cell with the modulator of FIG. 4A.

FIG. 4C is a cross section of the second electrolytic cell 71, being the neutralization cell and depicts the formation of hydrogen at the cathode electrode 79, while oxygen is produced at the anode electrode 77, according to the chemical formulas shown.

The acidic electrolyte solution 81 exiting from the cathode compartment 43 of the first electrolytic cell 67 is fed into the inlet 85 of the anode compartment 73 of the second electrolytic cell 71. The alkaline electrolyte solution 83 exiting the anode compartment 41 of the first electrolytic cell 67 is fed to the rear inlet 87 of the cathode compartment 75 of the second electrolytic cell 71. In addition to short-circuiting the electrodes 78, a modulator 82 may also be installed to improve the operation of the neutralizing electrolytic cell.

This set up will allow a better operation of the second electrolytic cell 71 as the potential difference of the alkaline 83 and acidic 81 electrolyte solutions are evened up rather than the strongest electrolyte solutions neutralizing each other and resulting in the weakened electrolyte solutions towards the end of the second electrolytic cell 71 having reduced potential to neutralize each other.

FIGS. 4A to 4C illustrate the process of electrolyzing water for increased hydrogen production. Electric power, such as from a solar or wind farm, through a DC power source 55 is applied through a modulator 57 to the anode electrode 47 housed within the anode compartment 41 of the first electrolytic cell 67, which contains the alkaline electrolyte solution 49 and to the cathode electrode 51 housed within the cathode compartment 43, which contains the acidic electrolyte solution 53, with a membrane or diaphragm 45 separating between the anode 47 and cathode 51 electrodes. The anode 47 and cathode 51 electrodes are made of titanium mesh as an example and coated with a catalyst such as platinum, platinum group oxides or metals such as nickel, cobalt, molybdenum or alloys or oxides of these precious and base metals.

Each of the anode compartments 41, 73 and a cathode compartments 43, 75 comprise of a plurality of non-conductive members 69, being a plurality of plastic baffles. These non-conductive members 69 are used to guide the alkaline 49, 83 and acidic 53, 81 electrolyte solutions, in and out of the anode electrodes 47, 77 and a cathode electrodes 51, 79, as the electrolyte solutions move from one end to the other in the respective anode compartments 41, 73 and a cathode compartments 43, 75.

It is readily appreciated that there may be more than 1 set of anode electrodes 47, 77 and cathode electrodes 51, 79 utilized in the first electrolytic 67 and second electrolytic 71 cells of the present invention. The electrolytic membrane 59 is commercially available and the diaphragm 45 may be made from an acid and alkali resistant material such as Teflon or polyurethane.

The pressure in the first electrolytic 67 and second electrolytic 71 cells may range from atmospheric up to 20 atmospheres and the temperature may range from 25° C. up to 200° C. The electrolyte solutions utilized in the first electrolytic 67 and second electrolytic 71 cells may include an inorganic acid and base, or weaker acid such as boric acid and weaker alkaline such as ammonia.

The electrolyte solutions 49, 53 exiting the first electrolytic cell 67 are positively and negatively charged and these charged electrolyte solutions 49, 53 are passed through the second electrolytic cell 71 where the electrolyte 49, 53 are short circuited leading the current flowing as shown in FIG.

4. Faraday's law provides that when current flows, substances are produced at the anode 77 and cathode 79 electrodes. In this case, hydrogen is produced at the anode 77 electrodes and oxygen is produced at the 79 cathode electrodes.

This increases the production of hydrogen so that theoretically, based on the voltage of 0.4012 volts at the first electrolytic cell 67, 2 moles of hydrogen are produced by applying only 0.401 volts at the primacy electrolytic cell 67. By calculation theoretically, 6.13 times more hydrogen is produced for the same energy used to produce 1 mol of hydrogen using the conventional electrolytic cell, in either alkaline electrolyte or acid electrolyte.

Figure 5A:
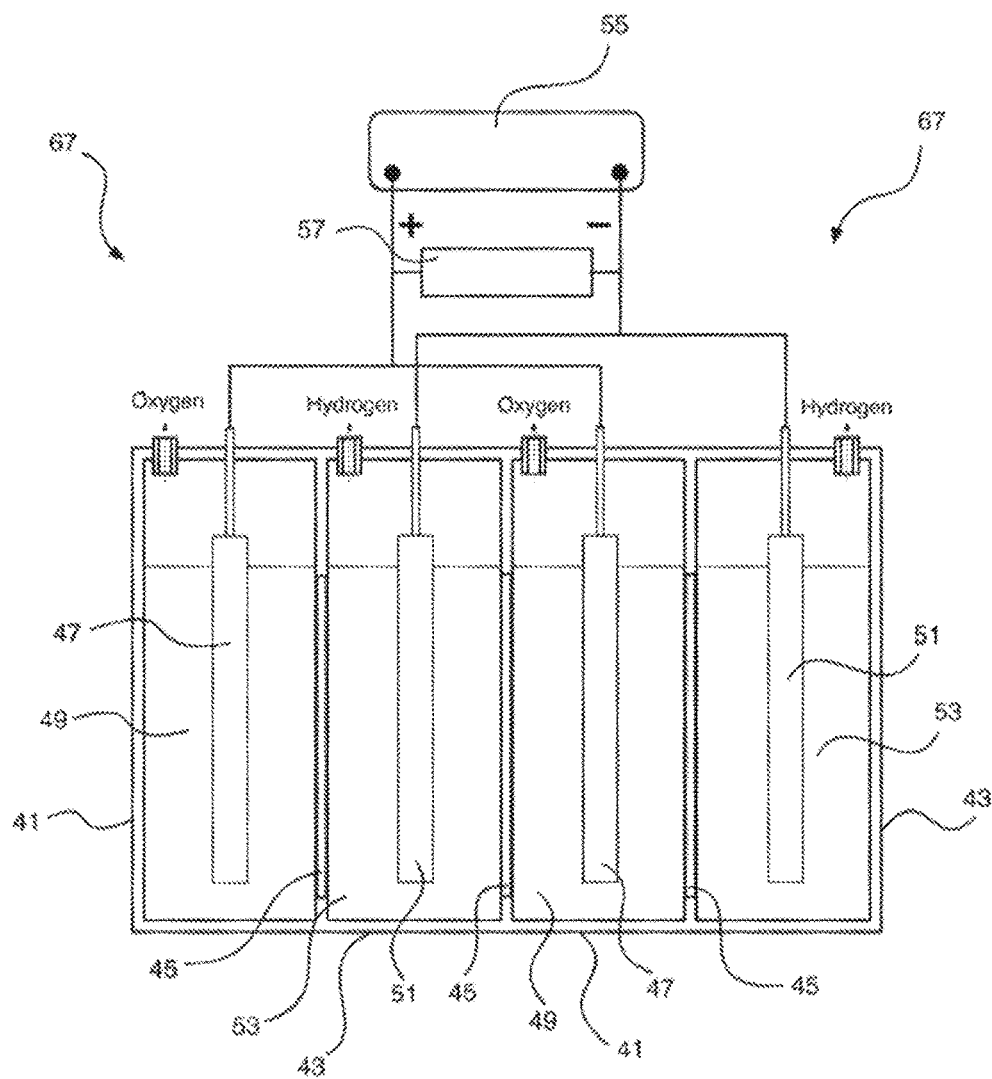
FIG. 5A illustrates a cross sectional view of a further embodiment of the electrolytic cell system of the present invention wherein multiple electrolytic cells are structured together to produce a higher capacity system.
Figure 5B:
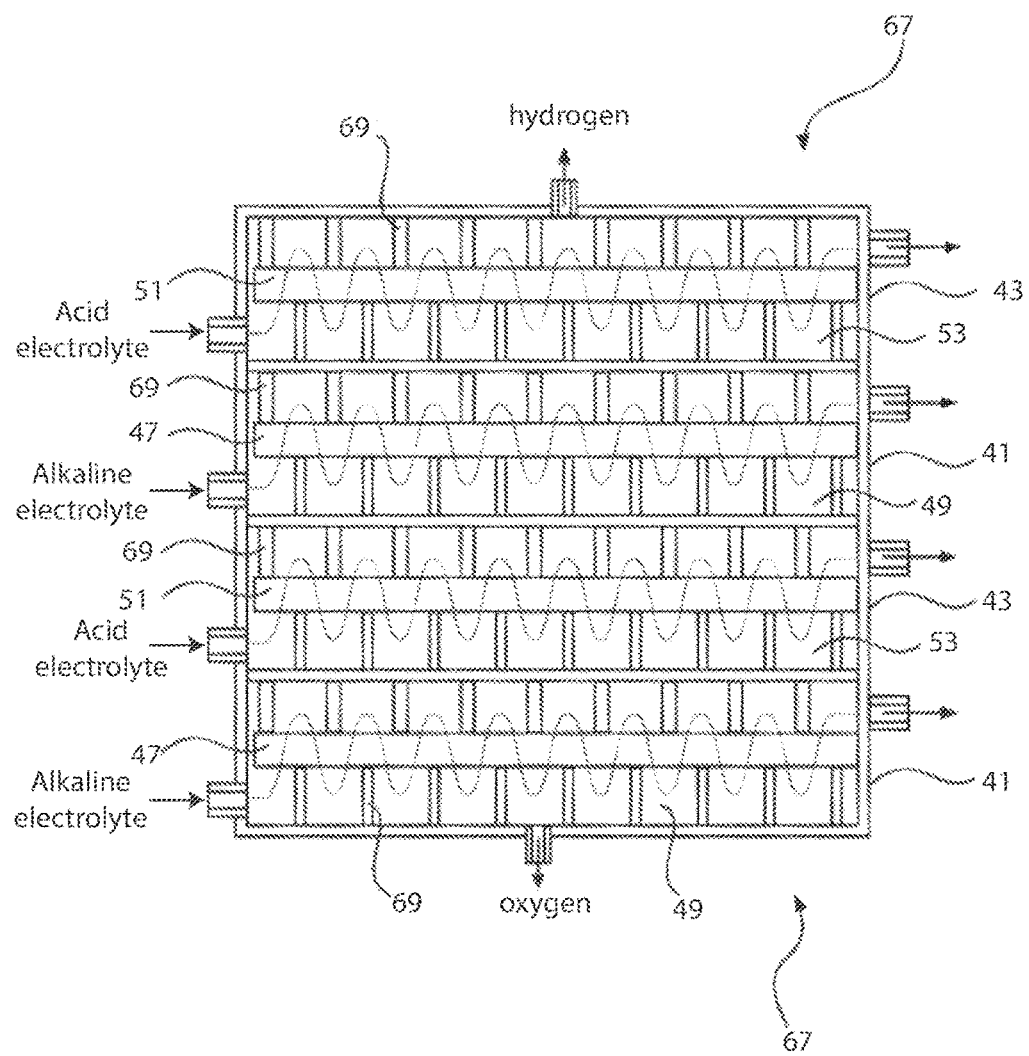
FIG. 5B illustrates a plan view of the multiple electrolytic cell system.

FIG. 5A illustrates a cross sectional view of a further embodiment of the electrolytic cell of the present invention wherein multiple electrolytic cells 67 are structured together to produce a higher capacity system. FIG. 5B illustrates the plan view of the multiple electrolytic cells 67.

Figure 6:
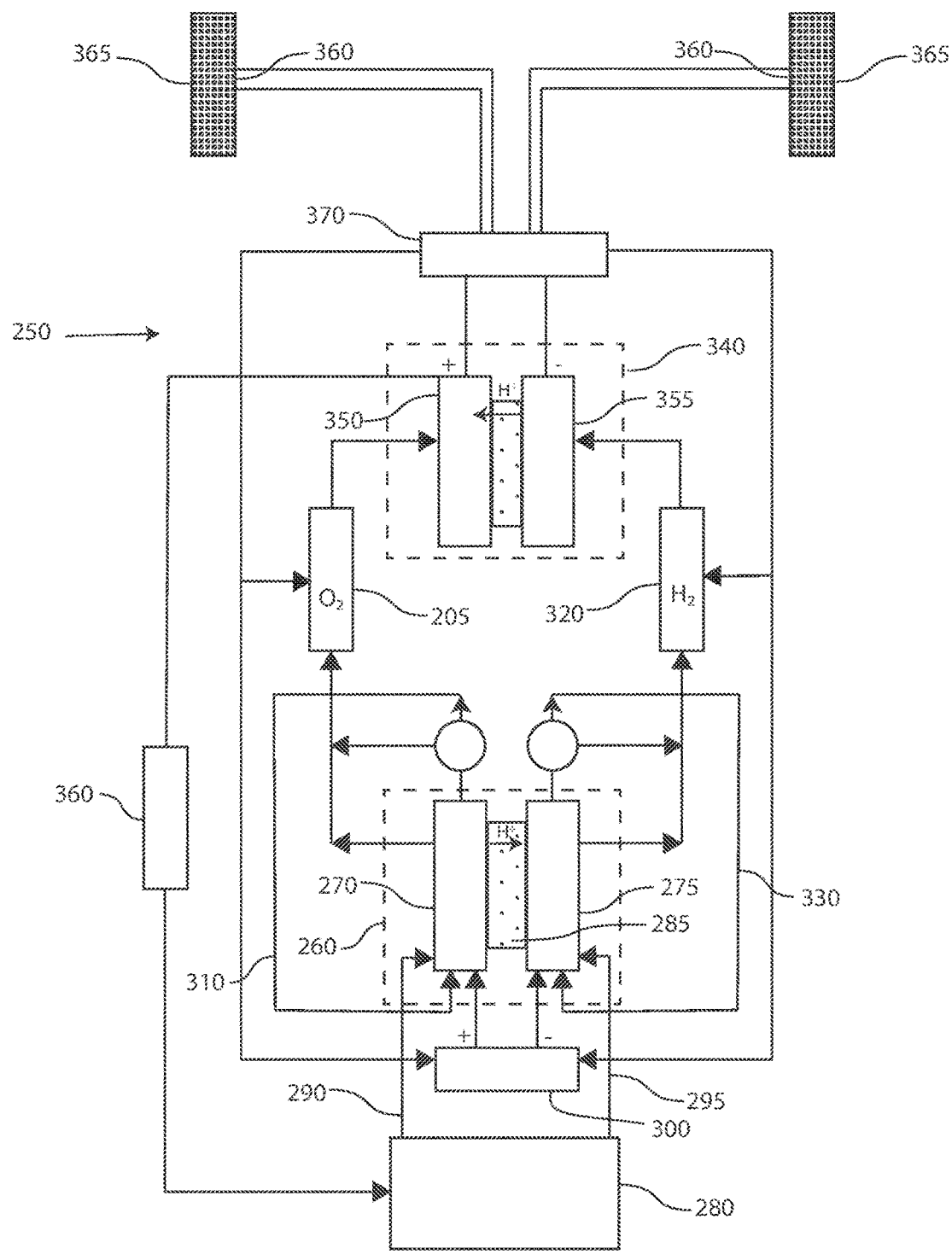
FIG. 6 is a diagrammatic view of an embodiment of the present invention with a unipolar electrolyser coupled to a hydrogen fuel cell.

FIG. 6 shows an embodiment of the present invention, an apparatus 250 for producing electrical energy, such as an electric motor vehicle, with a unipolar electrolyser 260 having an anode side 270 and cathode side 275. Distilled water from the distilled water storage unit 280 is provided to the anode side 270 and cathode side 275 via distilled water conduits 290 and 295 respectively, a DC power source 300 is operatively connected to the anode side 270 and cathode side 275, separated by a partition member 285, such as a porous diaphragm or an electrolytic membrane, which is commercially available and the porous diaphragm may be made from an acid and alkali resistant material such as Teflon or polyurethane.

On the anode side 270, the distilled water is reduced to oxygen, positively charged atoms (protons) and electrons. Oxygen produced on the anode side 270 is removed with any unconsumed water and fed to the oxygen storage tank 205. Alkaline or acid electrolyte on the anode side 270 is circulated via the circuit 310.

On the cathode side 275, protons that have travelled though the partition member 285 combine with electrons from the DC power source 300 to form hydrogen gas, which is then fed to the hydrogen gas storage tank 320. Alkaline or acid electrolyte on the cathode side 275 is circulated via the circuit 330.

The oxygen gas storage tanks 205 and hydrogen gas storage tank 320 are connected to a hydrogen fuel cell 340, with cathode side 350 and anode side 355 to generate electrical energy. Energy produced by the hydrogen fuel cell 340 is directed to the electric motors 360 to drive the drive wheels 365 via the controls 370 and a portion of the produced energy being directed back to the DC power supply 300.

Water vapour produced by the hydrogen fuel cell 340 can be condensed by the condenser 360 and fed back to the distilled water storage unit 280.

Unipolar water electrolysis, as described in U.S. Pat. No. 10,316,416, can produce green hydrogen for as low as 5.3 kwh/kg; however, with the very high currents and low voltage of the Unipolar process, it is estimated that commercial Unipolar electrolysis will require 10 to 15 kwh/kg.

As shown in FIG. 6, electrical energy feed to the Unipolar electrolyser 260 is assumed at 15 kwh. One kilogram of hydrogen is produced, and this is sent to the storage tank 320 and into the hydrogen fuel cell 340 along with the oxygen stored in the oxygen storage tank 105. With an 85% efficient hydrogen fuel cell, 340, the electricity output of the hydrogen fuel cell is 28.3 kwh/kg. As such, there is 13.3 kwh of electricity leftover for storage and to drive the electric motors 360 of the vehicle.

In FIG. 6, oxygen from the Unipolar electrolyser 260 is shown being fed to the hydrogen fuel cell. Another option is to release the oxygen from the Unipolar electrolyser to the atmosphere and then use air to feed the hydrogen fuel cell. This makes storing oxygen unnecessary and could represent some energy savings in some applications.

However, the recovery of the water from the hydrogen fuel cell 340 and recycling to the Unipolar electrolyser 260 is a major feature of this application.

Figure 7:
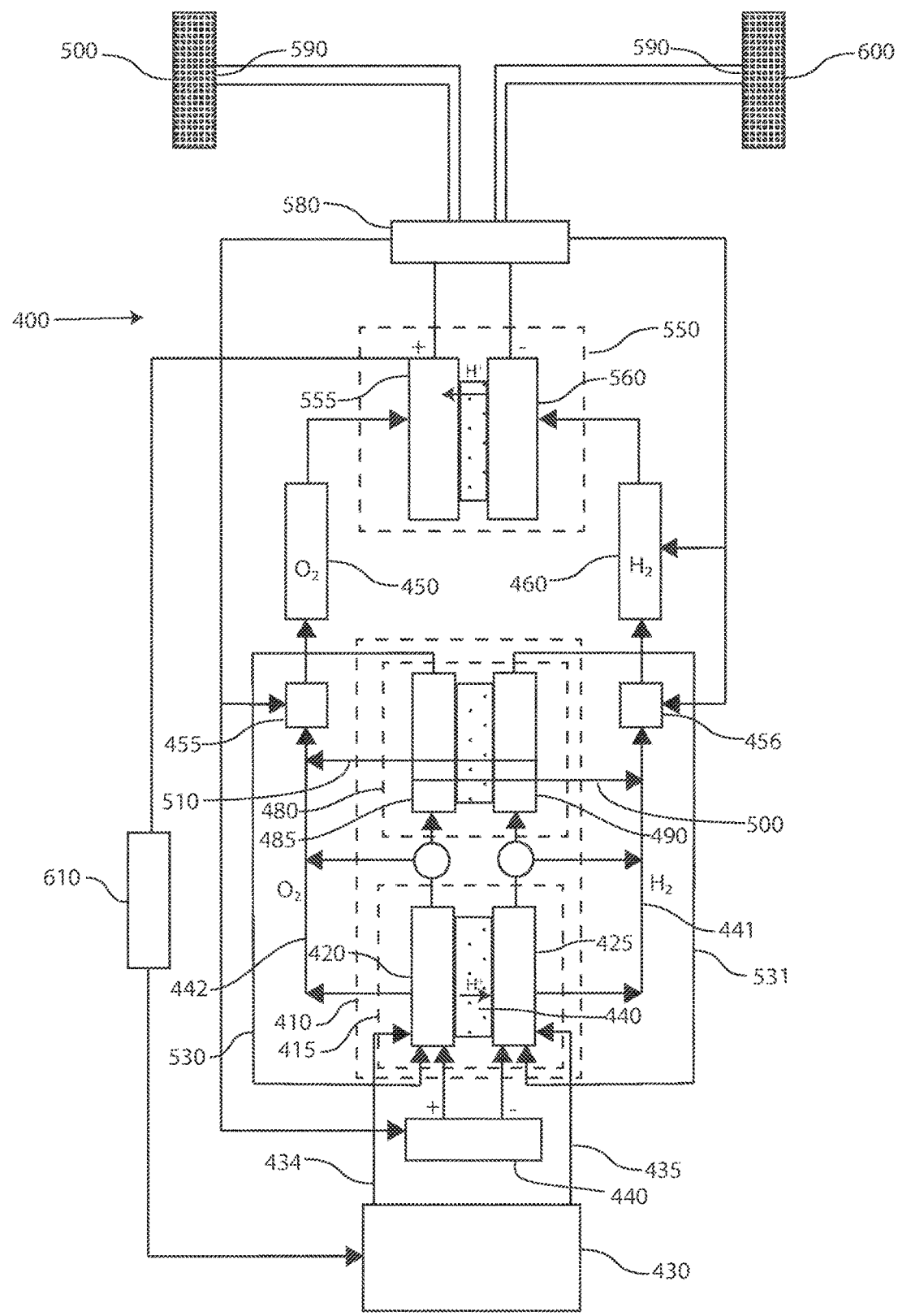
FIG. 7 is a diagrammatic view of an embodiment of the present invention which includes a neutralising cell.

Table 1 shows the data recorded in FIG. 7.

The figures shown in Table 1 (LHV data) and FIG. 7 are just an example of embodiments of the present invention. Total electrolyzer efficiency may be 8, 10, 12, 15 or 20 but certainly much lower than 33.33 kwh/kg of hydrogen.

TABLE 1

Calculations for a sustainable water fuelled vehicle-
LHV (lower heat value) and HHV (higher heat value)

| | LHV | HHV |
|---|---|---|
| Assumptions | | |
| Electrolyser efficiency, kw/kg hydrogen | 15 | 15 |
| H$_2$ storage for 350 atmospheres, kwh/kg | 4.01 | 4.01 |
| Storage pressure for H$_2$ and O$_2$, atmospheres | 15 | 15 |
| Fuel cell efficiency % | 85 | 85 |
| Heat content of H$_2$, kwh/kg | 33.33 | 39.44 |
| Output of neutralising cells of electrolyser, % | 95 | 95 |
| Calculations | | |
| H$_2$ produced by charging cells, kg | 1.260 | 1.004 |
| H$_2$ produced by neutralising cells, kg | 1.20 | 0.95 |
| Total H$_2$ produced by unipolar electrolysis, kg | 2.46 | 1.96 |
| O$_2$ required by hydrogen fuel cell, kg | 19.66 | 15.66 |
| Electricity for compressing H$_2$, kwh | 0.42 | 0.34 |
| Electricity for compressing 1 kg of O$_2$, kwh | 0.011 | 0.011 |
| Electricity for compressing O$_2$, kwh | 0.21 | 0.17 |
| Total electricity for compression, kwh | 0.63 | 0.50 |
| Gross electricity generated, kwh | 69.61 | 65.63 |
| Electricity for unipolar electrolysis, kwh | 18.9 | 15.06 |
| Net electricity for driving wheels, kwh | 50.07 | 50.07 |

In Table 1, the energy required to compress 1 kilogram of hydrogen to 15 atmospheres is:

$$\frac{15}{350} \times 4.01 = 0.172 \text{ kwh/kg of hydrogen}$$

Energy required to compress hydrogen to 15 atmospheres is:

$$0.172 \times 2.46 = 0.42 \text{ kwh}$$

For oxygen, the estimate is:

$$\frac{15}{350} \times \frac{4.01}{16} = 0.011 \text{ kwh/kg of oxygen}$$

The energy required to compress 19.66 kg of oxygen is:

$$0.011 \times 19.66 = 0.216 \text{ kwh}$$

The hydrogen produced in the charging cells of the present invention is 1.26 kg kilograms and the total hydrogen produced by the Unipolar electrolyser is 2.46 kg.

In Unipolar electrolysis, as an example, only 15 kilowatt-hours are required to produce 1 kilogram of hydrogen. The output of the charging cell is 15.64 kwh and the output of the neutralising cell is 14.86 kwh. The addition of these two provides a total output of hydrogen is 30.49 kwh. Since 15 kilowatts is required to produce a kilogram of hydrogen in Unipolar electrolysis, the total hydrogen produced is:

$$\frac{30.49}{15} = 2.033 \text{ kg of } H_2$$

The electricity generated in the fuel cell of the present invention is:

$$2.46 \times 33.33 \times \frac{85}{100} = 69.61 \text{ kwh}$$

The electricity required to produce the hydrogen in the charging cell is:

$$1.260 \times 15 = 18.9 \text{ kwh}$$

In FIG. 7, the product water from the fuel cell is recovered and recycled to the Unipolar electrolyser. Only some top up of distilled water is required due to minor loses of the product water.

In FIG. 7 a further embodiment of the invention is shown, being an apparatus 400 for producing electrical energy, such as an electric motor vehicle, with a unipolar electrolyser 410 having a first pair of charging cells 415 with anode 420 and cathode 425. Distilled water from the distilled water storage unit 430 is provided to the anode side 420 and cathode side 425 via distilled water conduits 434 and 435 respectively, a DC power source 440 is operatively connected to the anode side 420 and cathode side 425, separated by a partition member 440, such as a porous diaphragm or an electrolytic membrane, which is commercially available and the porous diaphragm may be made from an acid and alkali resistant material such as Teflon or polyurethane.

On the anode side 420, the distilled water is reduced to oxygen, positively charged atoms (protons) and electrons. Oxygen produced on the anode side 420 is removed with any unconsumed water and fed to the oxygen storage tank 450 via the compressor 455. On the cathode side 425, protons that have travelled though the partition member 440 combine with electrons from the DC power source 440 to form hydrogen gas, which is directed through line 441 to the compressor 455 and into the hydrogen gas storage tank 460.

In fluid communication with the first pair of charging cells 415 is a first set of neutralising cells 480, which contains a cathode 485 and an anode 490. Alkaline electrolyte from the anode side 420 of the first pair of charging cells 415 is then directed into the cathode side 485 and acid electrolyte from the cathode side of the first pair of charging cells 415 is directed towards the anode side 490.

The neutralising cell 480 allows the neutralization of the negatively charged acidic electrolyte solution from the cathode side 425 and the positively charged alkaline electrolyte solution from the anode side 420, exiting from the first electrolytic cell being the first pair of charging cells 415.

As a result, current flows between the anode electrode on the anode side 485 and the cathode electrode on the cathode side 490 and according to Faraday's Law, chemical reactions occur at the respective anode electrode and the cathode electrode.

On the cathode side 485 of the neutralising cell 480:

$$2H^+ + 2e^- \rightarrow H_2$$

Hydrogen produced on the cathode side 385 of the neutralising cell 480 can then be directed via line 500 to the hydrogen line 441, and compressed via the compressor 456 into the hydrogen storage tank 460.

On the anode side 490 of the neutralising cell 480:

$$2OH^- - 2e^- \rightarrow H_2O + \frac{1}{2}O_2$$

Oxygen produced on the anode side 490 of the neutralising cell 490 can then be directed via line 410 to the oxygen line 442, and compressed via the compressor 455 into the oxygen storage tank 450.

Alkaline electrolyte from the cathode side 485 of the neutralising cell 480 is then directed via line 530 back to the anode side 420 of the charging cell 415 and acid electrolyte from the anode side 490 of the neutralising cell 480 is then directed via line 531 back to the anode side 425 of the charging cell 415.

The oxygen gas storage tanks 450 and hydrogen gas storage tank 460, each of which can include approximately 15% atmosphere, are connected to a hydrogen fuel cell 550, with cathode side 555 and anode side 560 to generate electrical energy. Energy produced by the hydrogen fuel cell 550 is directed to the electric motors 590 to drive the drive wheels 600 via the controls 580 along with a portion of the produced energy being directed back to the DC power supply 440.

The hydrogen fuel cell 550 produces approximately 69.61 kwh, of which approximately 50.03 kwh is available for use by the electric motors 590, 0.21 kwh being utilised by the oxygen compressor 455 and 0.42 kwh being utilised by the hydrogen compressor.

Approximately 18.9 kwh is then returned to the DC supply 440 for use in unipolar electrolyser 410.

Water vapour produced by the hydrogen fuel cell 550 can be condensed by the condenser 610 and fed back to the distilled water storage unit 430.

In some applications such as the use of this technology for high speed aircraft with a rocket type engine, the product water cannot be recycled so that all the water required for the process is supplied.

In some applications, it may be more convenient to release the oxygen from the electrolyser to the atmosphere and then use air for the fuel cell. This may result in some savings on the storage of the oxygen at 15 atmospheres.

Figure 8:
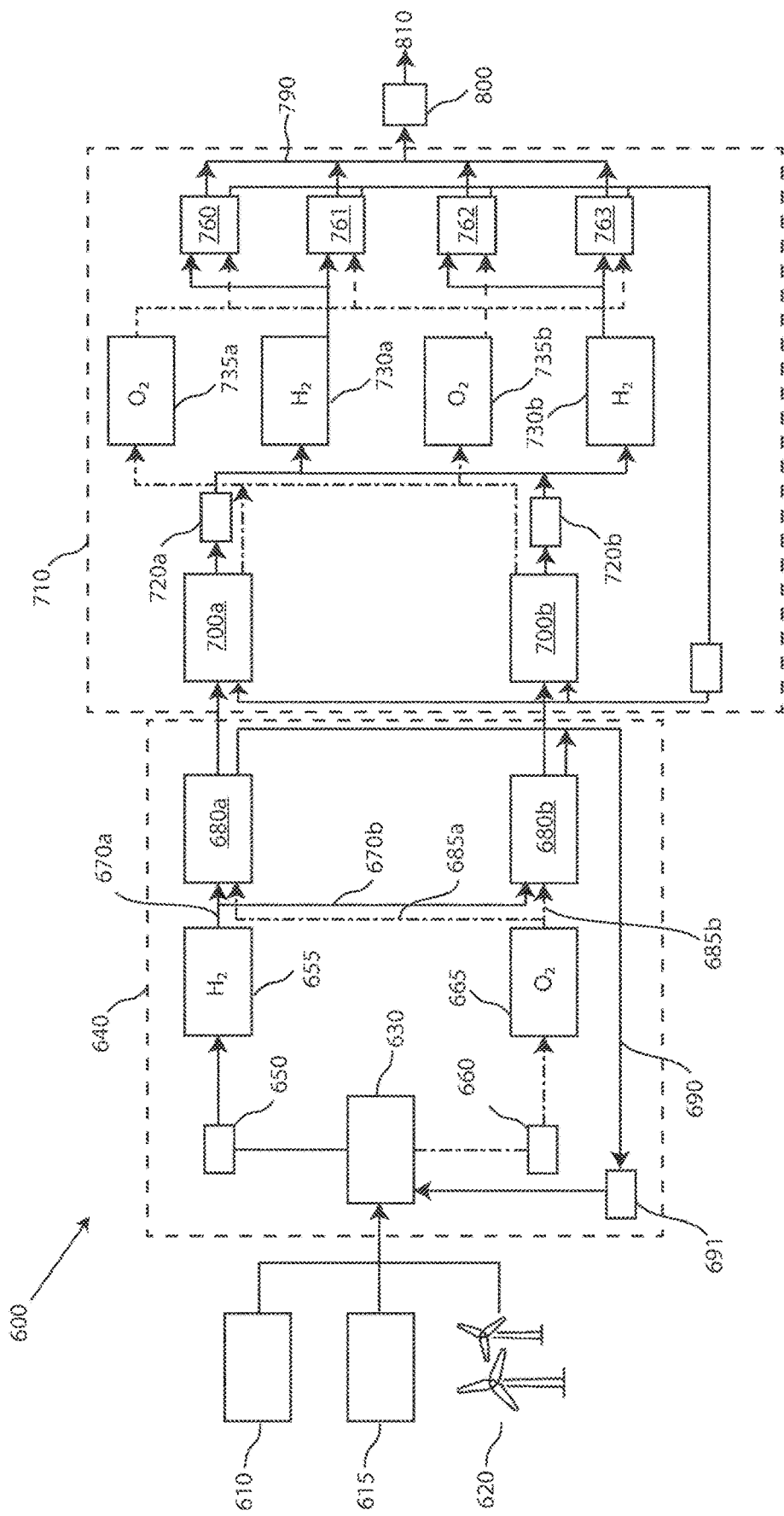
FIG. 8 is a diagrammatic view of a further embodiment of the present invention which includes a two stage process.

In this application, the water fueled vehicle may also be any of the following:
1. Large and small trucks,
2. Locomotives, 3. Mining trucks, loaders, and shovels,
4. Agricultural machinery,
5. Small and large boats,
6. Small and large military vehicles including tanks,
7. Small and large military ships,
8. Submarines of different sizes,
9. Slow and fast aircrafts of different sizes,
10. Large ships and bulk carriers of different sizes,
11. Large and small stationary power plants,
12. Rocket ships and space crafts,
13. Intercontinental ballistic missiles and similar armaments,
14. The production of Grid scale electricity, and
15. The production of electricity for industries and homes.
16. Aircraft In large scale applications of this present invention, the Unipolar electrolysis and the fuel cell operations can be carried out in two or more stage, such as stage one 640 and stage two 710, as shown in FIG. 8.

For example, in 600, there is a number of input sources of green energy being used, solar farm 610, hydro 615 and wind farm 620, to provide power to the unipolar electrolyser 630 of stage one, 640. Hydrogen produced from the unipolar electrolyser 630 is cooled/compressed at 650 and retained in large scale hydrogen storage tanks 655. Oxygen produced by the unipolar electrolyser 630 is cooled/compressed at 660 and retained in large scale hydrogen storage tank 665.

Hydrogen stored in the large scale hydrogen storage tanks 655 can then be fed via lines 670a to the hydrogen fuel cells 680a and 680b. Oxygen stored in the large scale hydrogen storage tank 665 can be fed via lines 685a and 685b to hydrogen fuel cells 680a and 680b. Electrical energy produce in the hydrogen fuel cells 685a and 685b is then used by the unipolar electrolysers 700a and 700b in the second stage 710. Water produced by the hydrogen fuel cells 680a and 680b is directed via line 690 to the water storage tank 691 to be fed back to the unipolar electrolyser 630.

In the second stage 710, the unipolar electrolysers 700a and 700b produce hydrogen. Hydrogen produced in the unipolar electrolyser 700a is cooled/compressed at 720a and retained in a small scale hydrogen storage tank 730a and 730b. Oxygen produced by the unipolar electrolyser 700a is retained in small scale hydrogen storage tanks 735a and 735b.

Hydrogen produced in the unipolar electrolyser 700b is cooled/compressed at 720b and retained in a small scale hydrogen storage tank 730a and 730b. Oxygen produced by the unipolar electrolyser 700b is retained in small scale hydrogen storage tanks 735a and 735b

Each of the storage tanks provides a supply of hydrogen or oxygen to an additional hydrogen fuel cell. For example, hydrogen from hydrogen storage tank 730a is directed to hydrogen fuel cell 760 and 761, hydrogen from hydrogen storage tank 730b is directed to hydrogen fuel cell 762 and 763. The oxygen from each of the oxygen storage tanks 735a and 735b is fed via a communal line into each of the hydrogen fuel cells 760, 761, 762 and 763.

The electrical energy output from stage two feeds via line 790 to the inverter 800 and into the main electrical grid 810.

The electricity produced from the first stage fuel cell is used to power the second Stage electrolyser and the hydrogen and oxygen produced in the second electrolyser are fed to the second fuel cells. This process is shown on FIG. 8.

In Stage one, water from the fuel cells is collected and returned to the electrolyser. This is the same in Stage Two. There will be small amount of loses and make up water is provided.

With a combined input from renewable energy sources 610, 615 and 620 at approximately 73.79 billion kwh, the output back into the grid 810 using the two stage form of the present invention, as shown in FIG. 8, would be approximately 336.2 billion kwh. This will eliminate the 189.74 billion kwh from coal and natural gas power plants.

In FIG. 8, electricity can be produced even when the sun is not shining, or the wind is not blowing by using the hydrogen and oxygen that is stored. The production of green electricity is more independent of sun and wind.

The invention as disclosed will encourage the widespread use of water to power transport vehicles instead of polluting carbon fuels and help save our planet from disastrous climate change.

An apparatus where distilled water from the fuel cells is electrolysed by Unipolar electrolysis according to U.S. Pat. No. 10,314,316 and the oxygen and hydrogen produced is stored before feeding to a hydrogen fuel cell to produce electricity. This electricity is then used for the Unipolar electrolysis of water, storage of hydrogen and oxygen. The efficiency of the fuel cell is accounted for in the electricity produced.

For larger applications, two or more stages can be used to produce the electricity or hydrogen required.

EXAMPLES

A. A process where electricity from a fuel cell is used in a Unipolar electrolysis of water according to my U.S. Pat. No. 10,314,316, UK Patent GB2537456, Australian Patent 2015291762, and China Patent 2158001619.7-"Diaphragm Type Electrolytic Cell and a Process for the Production of Hydrogen from the Unipolar Electrolysis of Water" where the hydrogen and oxygen are stored before being fed to the fuel cell where enough electricity is produced to power the Unipolar electrolyser, the storage of the hydrogen and oxygen, and to power the driving wheels of a vehicle, and the water produced by the fuel cell is returned to the Unipolar electolyzer, B. A process as in A where the vehicle may be a family car, small or large trucks, small or large ships, small or large low speed airplanes, mining trucks and machinery, agricultural trucks and machinery, small and large military vehicles, small and large naval ships and submarines, small and large military aircrafts, space crafts, ballistic missiles and small and large electricity generators.

C. A process as in B where the vehicle is a high speed jet type aircraft where water formed in combustion of the hydrogen and oxygen in a rocket engine is discharged in the exhaust and the high speed aircraft carries all the water it requires.

D. A process as in A where the Grid scale electricity production is carried out with the water produced at the fuel cell is recycled to the Unipolar electrolyzer.

E. A process as in A where the oxygen from the Unipolar electrolyser may be released to the atmosphere and the fuel cell will reclaim it from the air.

F. An apparatus where electricity from a fuel cell is used in a Unipolar electrolysis of water according to my U.S. Pat. No. 10,314,316 where the hydrogen and oxygen are stored before being fed to the fuel cell where enough electricity is produced to power the Unipolar electrolyser, the storage of the hydrogen and oxygen, and to power the driving wheels of a vehicle, and the water produced by the fuel cell is recycled to the Unipolar electrolyser.

G. An apparatus as in F where the vehicle may be a family car, small or large trucks, small or large ships, small or large low speed and high speed aircraft, mining trucks and machinery, agricultural trucks and machinery, small and large military vehicles, small and large naval ships and submarines, small and large military aircrafts, space crafts, ballistic missiles and small and large electricity generators, H. A power generation apparatus for producing electricity, the apparatus including: an electrolytic cell system (unipolar electrolyser) comprising:
  at least a first electrolytic cell having at least one anode compartment housing an anode electrode and alkaline electrolyte producing oxygen and at least one cathode compartment housing a cathode electrode and acidic electrolyte producing hydrogen, with a partition member separating the anode compartment from the cathode compartment and a DC supply applied to the anode and cathode electrodes; and
  a hydrogen fuel cell operatively coupled to the first electrolytic cell; wherein hydrogen and oxygen produced by the least a first electrolytic cell is stored in a storage and then fed to the hydrogen fuel cell to produce electrical energy.

I. The power generation apparatus of H, wherein there is at least a second electrolytic cell having at least one cathode compartment/side housing a cathode electrode receiving the positively charged alkaline electrolyte from the first anode cell and producing hydrogen, and having at least one anode compartment/side housing an anode electrode and receiving the negatively charged acidic electrolyte from the first cathode cell and producing oxygen with a partition member separating the anode cell from the cathode cell, when the anode electrodes and the cathode electrodes are connected in short circuit.

J. The power generation apparatus of any H or I, wherein there is at least one partition member separating the anode and cathode compartments in each of the first and second electrolytic cells.

K. The power generation apparatus of any one the above H-I, wherein the partition member may be a porous diaphragm or an electrolytic membrane or a non-conducting partition with a salt bridge or a semi-conducting or conducting member connecting the anode electrolyte to the cathode electrolyte.

L. The power generation apparatus of any one the above H-K, wherein a direct current (DC) power source is connected to a modulator of the first cathode and first anode electrodes.

M. The power generation apparatus of any one of H-L, wherein the production of electrical energy powers the Unipolar electrolyser, the storage of the hydrogen and oxygen.

N. The power generation apparatus of any one of the above H-M, wherein water produced by the hydrogen fuel cell is returned to the Unipolar electrolyser.

O. The power generation apparatus of any one of H-N, wherein the electrical energy produced provides power for small and large electricity generators.

P. The power generation apparatus of any one of H-O, wherein the electrical energy produced powers driving wheels of a vehicle, wherein the vehicle is selected from the group of: family car, small or large trucks, small or large ships, small or large low speed airplanes, mining trucks and machinery, agricultural trucks and machinery, small and large military vehicles, small and large ships and submarines, small and large aircraft, and space crafts.

Q. The power generation apparatus of any one of H-P, wherein the vehicle is selected from the group of: a high speed jet type aircraft where water formed in combustion of the hydrogen and oxygen in a rocket engine is discharged in the exhaust and the high speed aircraft carries all the water it requires, R. A process when used for producing electrical energy using the power generation apparatus as claimed in any one of H-Q

The invention claimed is:

1. A power generation apparatus for producing electricity, the apparatus comprising:
  an electrolytic cell system (Unipolar electrolyser) comprising:
  at least a first electrolytic cell having at least one anode compartment housing an anode electrode and alkaline electrolyte producing oxygen and at least one cathode compartment housing a cathode electrode and acidic electrolyte producing hydrogen, with a partition member separating the anode compartment from the cathode compartment and allowing a buildup of hydrogen ions at the anode compartment and a buildup of hydroxide ions at the cathode compartment and with a DC supply applied to the anode and cathode electrodes; and
  at least a second electrolytic cell which is a neutralizing cell and having at least one cathode compartment housing a cathode electrode receiving the alkaline electrolyte that is positively charged from the anode compartment of the first electrolytic cell and producing hydrogen, and having at least one anode compartment housing an anode electrode and receiving the acidic electrolyte that is negatively charged from the cathode compartment of the first electrolytic cell and producing oxygen with a partition member separating the anode compartment from the cathode compartment,
  wherein the anode electrodes and the cathode electrodes are connected in short circuit so that current flows and further hydrogen and oxygen are produced;
  a hydrogen fuel cell operatively coupled to the electrolytic cell system; wherein hydrogen and oxygen produced by the electrolytic cell system are stored in a storage and then fed to the hydrogen fuel cell to produce electrical energy.

2. The power generation apparatus of claim 1, wherein there is at least one partition member separating the anode and cathode compartments in each of the first and second electrolytic cells.

3. The power generation apparatus of claim 2, wherein the partition member is a porous diaphragm or an electrolytic membrane or a non-conducting partition with a salt bridge or a semi-conducting or conducting member connecting the anode electrolyte to the cathode electrolyte.

4. The power generation apparatus of claim 1, wherein a direct current (DC) power source is connected to a modulator of the first cathode and first anode electrodes.

5. The power generation apparatus of claim 1, wherein the production of electrical energy powers the Unipolar electrolyser, the storage of the hydrogen and oxygen.

6. The power generation apparatus of claim 1, wherein water produced by the hydrogen fuel cell is returned to the Unipolar electrolyser.

7. The power generation apparatus of claim 1, wherein the electrical energy produced provides power for small and large electricity generators.

8. The power generation apparatus of claim 1, wherein the electrical energy produced powers driving wheels of a vehicle, wherein the vehicle is selected from the group of: family car, small or large trucks, small or large ships, small or large low speed airplanes, mining trucks and machinery, agricultural trucks and machinery, small and large military vehicles, small and large ships and submarines, small and large aircraft, and space crafts.

9. The power generation apparatus of claim 8, wherein the vehicle is selected from the group of: a high speed jet type aircraft where water formed in combustion of the hydrogen and oxygen in a rocket engine is discharged in the exhaust and the high speed aircraft carries all the water it requires.

10. A process when used for producing electrical energy using the power generation apparatus as claimed in claim 1.

* * * * *